(12) United States Patent
     Day

(10) Patent No.: US 11,889,827 B1
(45) Date of Patent: Feb. 6, 2024

(54) DEER STAND SUPPORT DEVICE

(71) Applicant: Dennis Day, Alton, IL (US)

(72) Inventor: Dennis Day, Alton, IL (US)

( * ) Notice: Subject to any disclaimer, the term of this patent is extended or adjusted under 35 U.S.C. 154(b) by 0 days.

(21) Appl. No.: 17/880,110

(22) Filed: Aug. 3, 2022

(51) Int. Cl.
     *A01M 31/02* (2006.01)
(52) U.S. Cl.
     CPC .................................. *A01M 31/02* (2013.01)
(58) Field of Classification Search
     CPC ..... A01M 31/02; A01M 31/025; E04G 5/065; E04G 5/061; E04G 5/067; E04G 5/06
     USPC .......................................................... 182/116
     See application file for complete search history.

(56) References Cited

U.S. PATENT DOCUMENTS

| | | | | |
|---|---|---|---|---|
| 4,069,891 A * | 1/1978 | McClung | ............. | A01M 31/02 D25/19 |
| 4,601,364 A * | 7/1986 | York | .................. | A01M 31/02 182/187 |
| 4,667,773 A | 5/1987 | Davis | | |
| 5,439,074 A * | 8/1995 | Trout | .................... | A01M 31/02 182/187 |
| 5,538,101 A * | 7/1996 | Kempf | .................... | A45F 3/26 182/187 |
| 5,562,180 A * | 10/1996 | Herzog | ................. | A01M 31/02 182/187 |
| 6,199,660 B1 * | 3/2001 | Meeks | ................... | A01M 31/02 182/187 |
| 8,794,383 B2 | 8/2014 | Furseth | | |
| 9,038,778 B1 * | 5/2015 | Carter | ..................... | E06C 7/423 182/20 |
| 11,229,200 B1 * | 1/2022 | Gardner | ................ | A01M 31/02 |
| 2003/0178255 A1 * | 9/2003 | Auer | ...................... | A01M 31/00 182/187 |
| 2007/0089932 A1 * | 4/2007 | Boyett | .................... | A63B 27/00 182/133 |
| 2007/0171062 A1 * | 7/2007 | Powell | .................... | A01M 31/02 340/568.4 |
| 2007/0261919 A1 * | 11/2007 | Roe | ......................... | A01M 31/02 182/187 |
| 2008/0236948 A1 * | 10/2008 | duCellier | ............... | A01M 31/02 182/187 |
| 2010/0065371 A1 | 3/2010 | Glenn | | |
| 2010/0300808 A1 * | 12/2010 | Hale | ....................... | A01M 31/02 182/187 |
| 2011/0132686 A1 * | 6/2011 | Priest | ..................... | A01M 31/02 182/187 |
| 2011/0308887 A1 * | 12/2011 | Johnson | ................ | A01M 31/02 182/187 |
| 2012/0024630 A1 * | 2/2012 | VanLaningham | ...... | A01M 31/02 182/116 |

(Continued)

*Primary Examiner* — Daniel P Cahn
*Assistant Examiner* — Shiref M Mekhaeil

(57) ABSTRACT

A deer stand support device for supporting the floor of a deer stand device from below the floor by anchoring to a vertical support includes an anchoring member configured for positioning in an anchoring position in abutment with a vertical support such that a receiving member coupled to the anchoring member extends away from the vertical support and upward. A support strap secures the anchoring member to the vertical support in the anchoring position. An inserting member is telescopically received into the receiving member and lockable in each of a plurality of locking positions. A floor support member is coupled to the inserting member and is configured for securely clamping to a floor of a deer stand via a clamp.

12 Claims, 4 Drawing Sheets

(56) References Cited

U.S. PATENT DOCUMENTS

| | | | |
|---|---|---|---|
| 2014/0264213 A1* | 9/2014 | Nipper | A01M 31/02 254/390 |
| 2015/0129360 A1 | 5/2015 | Shiver | |
| 2018/0186614 A1* | 7/2018 | Berkbuegler | E06C 1/39 |
| 2018/0310546 A1* | 11/2018 | Pope | A01M 31/02 |
| 2019/0231076 A1* | 8/2019 | Christie | A47C 1/00 |
| 2020/0054001 A1* | 2/2020 | LeBire | F41A 23/06 |
| 2020/0205397 A1* | 7/2020 | Adams | A45F 3/26 |
| 2022/0240496 A1* | 8/2022 | Miller | A01M 31/02 |
| 2022/0279776 A1* | 9/2022 | Spurlock | A01M 31/02 |

\* cited by examiner

US 11,889,827 B1

DEER STAND SUPPORT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to deer stand support devices and more particularly pertains to a new deer stand support device for supporting the floor of a deer stand device from below the floor by anchoring to a vertical support.

(2) Description of Related Art Including Information Disclosed Under 37 CFR 1.97 and 1.98

The prior art relates to deer stand support devices which support a floor of a deer stand from below and anchor to a vertical support. Several devices in the prior art support the floor of the deer stand in this way, and one such device also uses a telescoping member which is lockable in a plurality of locking positions using a locking pin inserted into each of the telescoping members. However, the prior art does not disclose a device which provides a support device below the deer stand in addition to an independent means of support which uses a telescoping device set at a constant angle to the vertical support and being clampable to the floor of the deer stand.

BRIEF SUMMARY OF THE INVENTION

An embodiment of the disclosure meets the needs presented above by generally comprising an anchoring member configured for positioning in an anchoring position in abutment with a vertical support such that a receiving member coupled to the anchoring member extends away from the vertical support and upward. A support strap secures the anchoring member to the vertical support in the anchoring position. An inserting member is telescopically received into the receiving member and lockable in each of a plurality of locking positions. A floor support member is coupled to the inserting member and is configured for securely clamping to a floor of a deer stand via a clamp.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
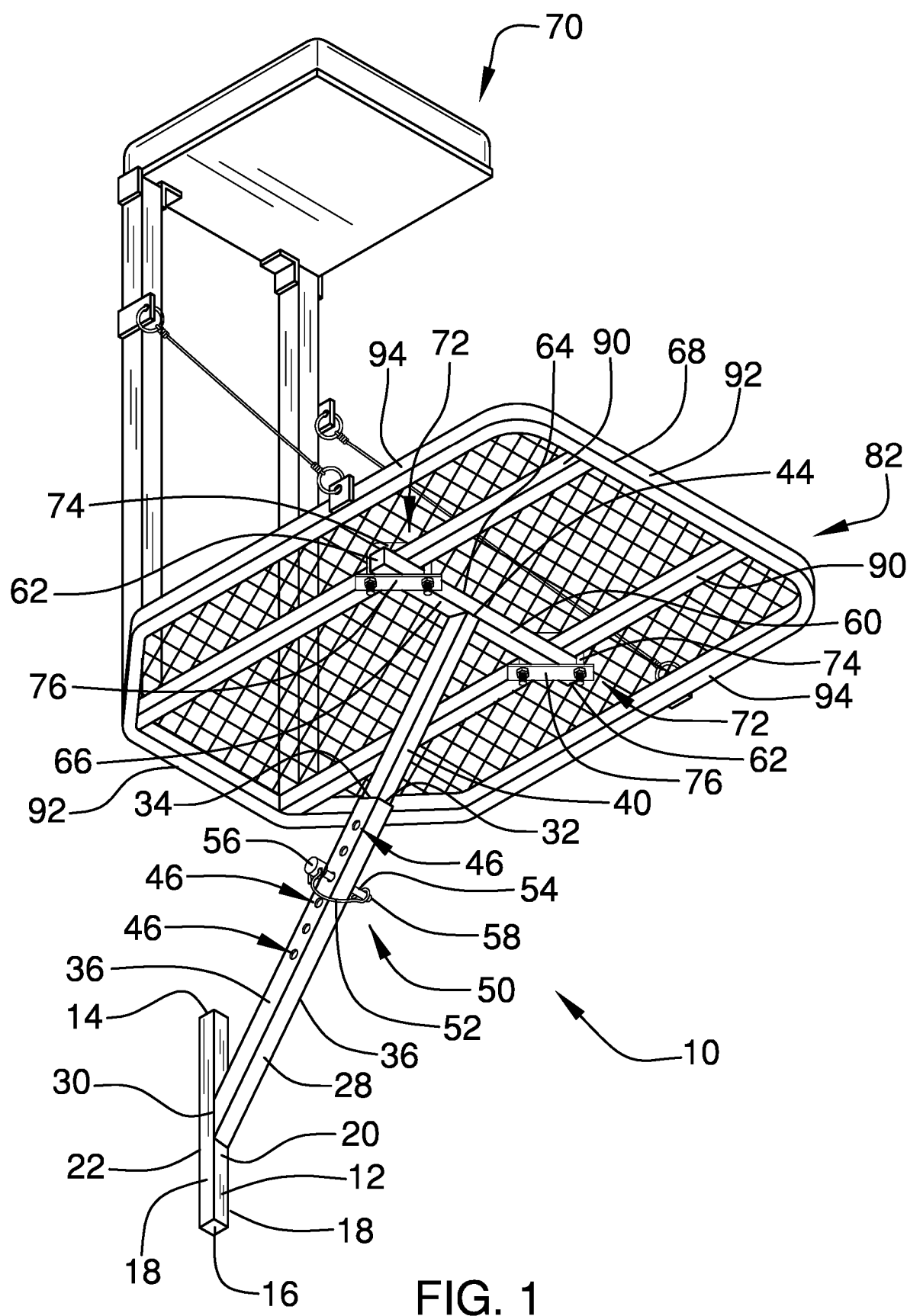
FIG. 1 is a bottom front side perspective view of a deer stand support device according to an embodiment of the disclosure.
Figure 2:
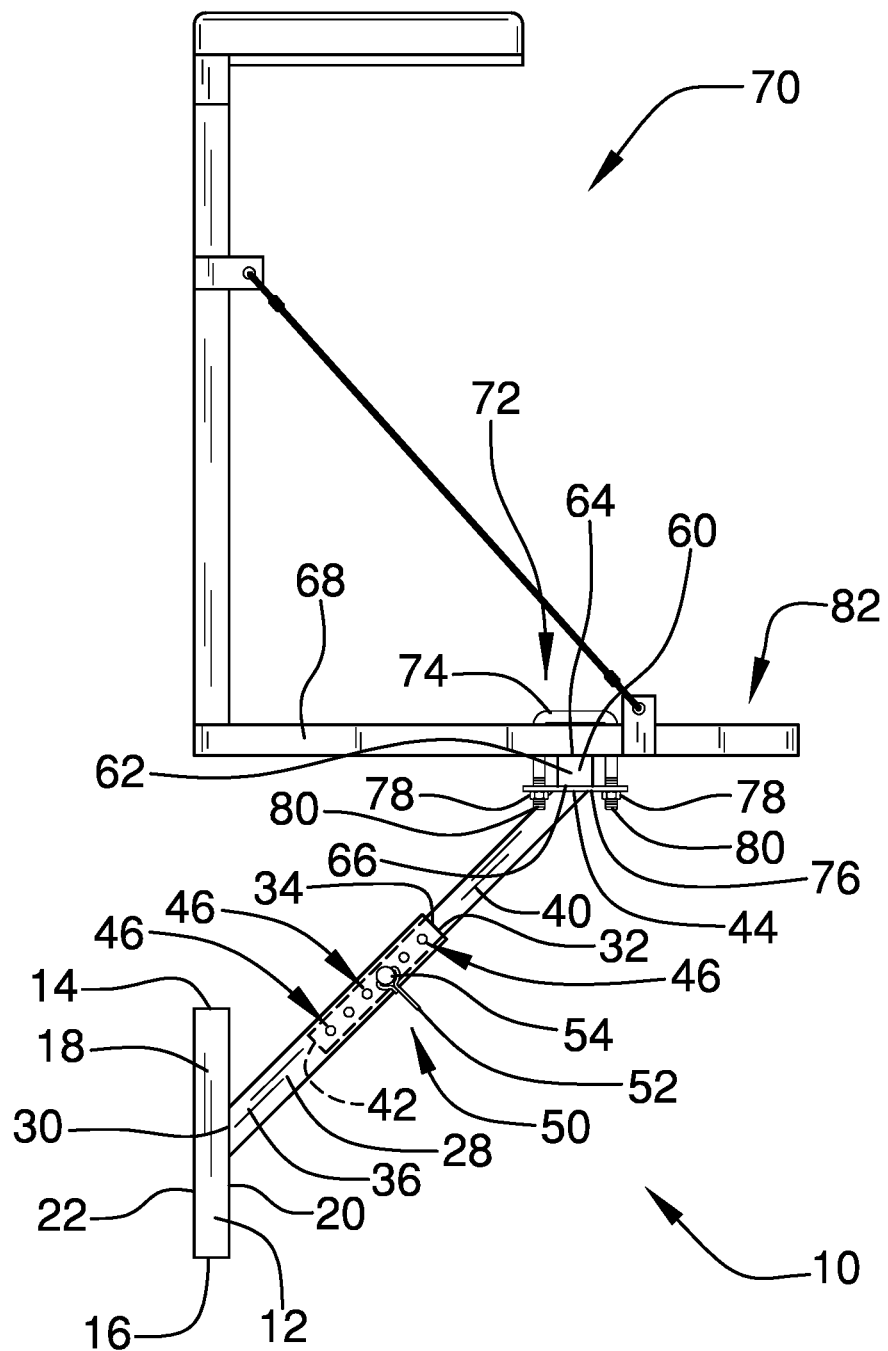
FIG. 2 is a side view of an embodiment of the disclosure.
Figure 3:
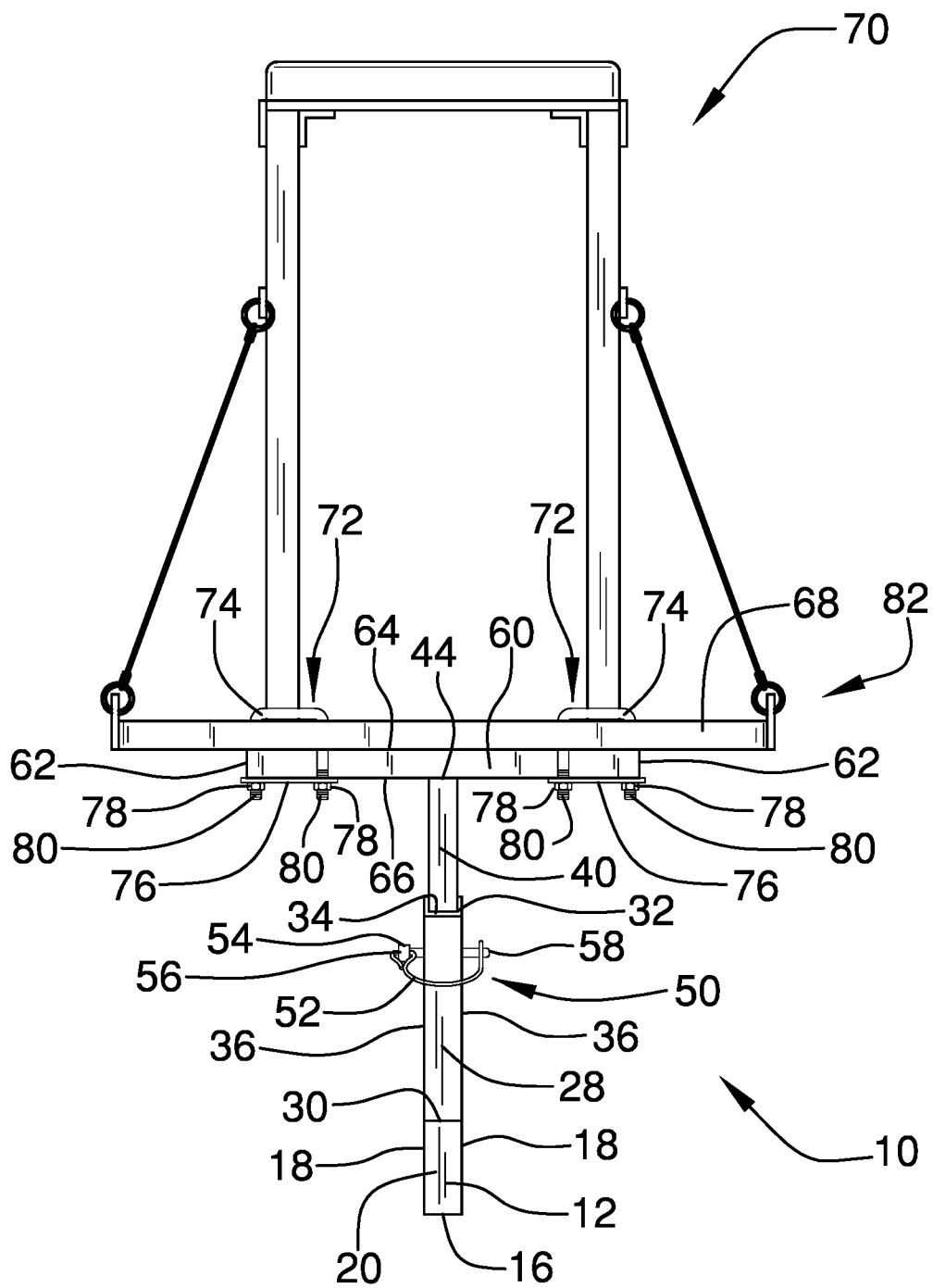
FIG. 3 is a front view of an embodiment of the disclosure.
Figure 4:
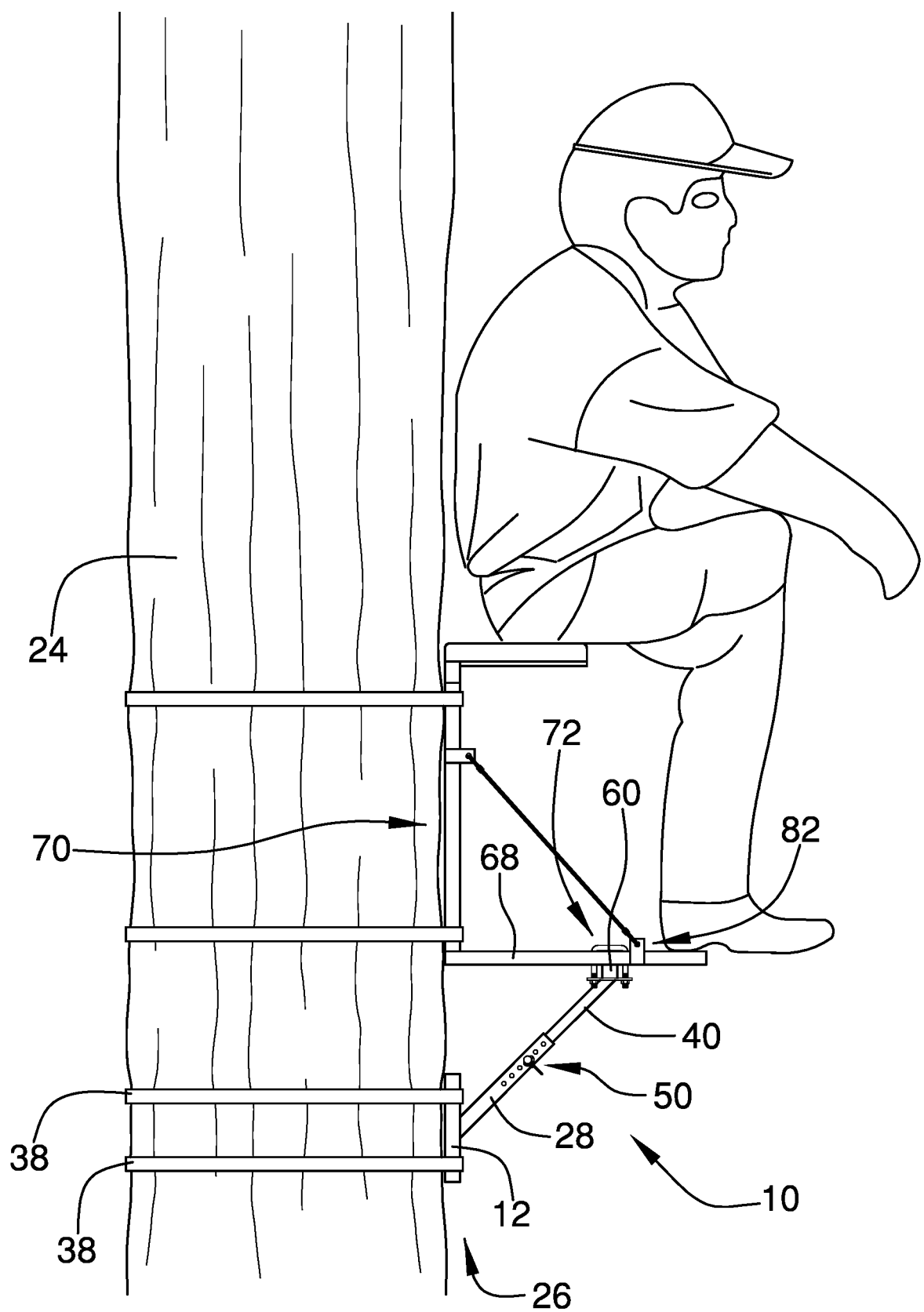
FIG. 4 is an in-use view of an embodiment of the disclosure.

With reference now to the drawings, and in particular to FIGS. 1 through 4 thereof, a new deer stand support device embodying the principles and concepts of an embodiment of the disclosure and generally designated by the reference numeral 10 will be described.

As best illustrated in FIGS. 1 through 4, the deer stand support device 10 generally comprises an anchoring member 12. The anchoring member 12 is elongate between a top end 14 of the anchoring member 12 and a bottom end 16 of the anchoring member 12 and has a pair of lateral sides 18 extending between the top end 14 of the anchoring member 12 and the bottom end 16 of the anchoring member 12. The anchoring member 12 also has a front side 20 and a back side 22 opposite the front side which both extend between the top end 14 of the anchoring member 12 and the bottom end 16 of the anchoring member 12 and between the pair of lateral sides 18 of the anchoring member 12. The anchoring member 12 is formed of a square anchoring member tube. The anchoring member 12 is configured for positioning in an anchoring position 26 whereby the anchoring member 12 abuts a vertical support 24, the top end 14 of the anchoring member 12 faces upward, and the front side 20 of the anchoring member 12 faces away from the vertical support 24.

A receiving member 28 extends from the front side 20 of the anchoring member 12 and is angled away from the bottom end 16 of the anchoring member 12. The receiving member 28 is elongate between a proximal end 30 of the receiving member 28 relative to the anchoring member 12 and a distal end 32 of the receiving member 28 relative to the anchoring member 12. The proximal end 30 of the receiving member 28 is centered between the top end 14 of the anchoring member 12 and the bottom end 16 of the anchoring member 12. The receiving member 28 has a pair of lateral sides 36 extending between the proximal end 30 of the receiving member 28 and the distal end 32 of the receiving member 28, each of which is coplanar with a respective lateral side 18 of the pair of lateral sides 18 of the anchoring member 12. The receiving member 28 defines a hollow space and an opening 34 to the hollow space on the distal end 32 of the receiving member 28. The receiving member 28 is formed of a square receiving member tube.

A pair of support straps 38 is flexible and is configured for looping around the vertical support 24 and the anchoring member 12 while the anchoring member 12 is in the anchoring position 26. Each support strap 38 is configured for engaging the front side of the anchoring member 12 between the receiving member 28 and a respective one of the top end 14 of the anchoring member 12 and the bottom end 16 of the anchoring member 12 while the anchoring member 12 is in the anchoring position 26, thereby clamping the anchoring member 12 to the vertical support 24.

An inserting member 40 is telescopically coupled to the receiving member 28, wherein the inserting member 40 inserts through the opening 34 and into the hollow space of the receiving member 28. The inserting member 40 is elongate between a proximal end 42 of the inserting member 40 relative to the receiving member 28 and a distal end 44 of the inserting member 40 relative to the receiving member 28 and is lockable in each of a plurality of locking positions relative to the receiving member 28. The inserting member 40 is formed of a square inserting member tube.

A plurality of receiving member holes 46 extend through the pair of lateral sides 36 of the receiving member 28 and is positioned along a central longitudinal axis of the receiving member 28. An inserting member hole is positionable in alignment with each receiving member hole 46. A locking pin 50 is insertable concurrently through the inserting member 40 and each receiving member hole 46 when the inserting member hole is aligned with each receiving member hole 46, thereby securing the inserting member 40 to the receiving member 28 in each of the plurality of locking positions. The locking pin comprises a retaining wire 52 which is coupled to a first end 56 of a pin portion 54 of the locking pin 50 and removably couplable to a second end 58 of the pin portion 54 of the locking pin 50 opposite the first end 56 of the pin portion 54 of the locking pin 50. The retaining wire 52 secures the pin portion 54 of the locking pin 50 to the receiving member 28 and the inserting member 40 when coupled to the second end 58 of the pin portion 54 of the locking pin 50 while the pin portion 54 of the locking pin 50 is inserted concurrently through the inserting member hole and each receiving member hole 46.

A floor support member 60 is coupled to the distal end 44 of the inserting member 40. The floor support member 60 is elongate between a pair of ends 62 of the floor support member 60. The floor support member 60 also has a top side 64 and a bottom side 66 opposite the top side 64, each of which extend between the pair of ends 62 of the floor support member 60. The inserting member 40 is coupled to the bottom side 66 of the floor support member 60 and centered between the pair of ends 62 of the floor support member 60. The floor support member 60 extends laterally from the inserting member and the top side 64 of the floor support member 60 faces upward when the anchoring member 12 is in the anchoring position 26. The top side 64 of the floor support member 60 is configured for supporting a floor 68 of a deer stand 70 when the anchoring member 12 is in the anchoring position 26. The floor support member 60 is formed of a square floor support member tube. The floor 68 of the deer stand 70 has a pair of spaced and parallel cross members 90 extending perpendicularly to a first pair of opposed sections 92 of an outer periphery of the floor 68. The pair of spaced and parallel cross members 90 extends parallel to a second pair of opposed sections 94 of the outer periphery of the floor 68.

Each of a pair of clamping assemblies 72 comprises a U-bolt 74, a mounting plate 76, and a pair of nuts 78. The pair of clamping assemblies 72 is configured for positioning in a clamping configuration 82 for securing the floor 68 of the deer stand 70 to the floor support member 60 proximate a respective end of the pair of ends 62 of the floor support member 60. The clamping configuration 82 comprises each clamping assembly 72 receiving the floor 68 support member and a cross member of the floor 68 of the deer stand 70 through a space between a portion of the U-bolt 74 of each clamping assembly 72 and the mounting plate 76 of each clamping assembly 72, the mounting plate 76 of each clamping assembly 72 abutting the bottom side 66 of the floor support member the portion of the U-bolt 74 of each clamping assembly 72 abutting the cross member opposite the floor support member 60, and the pair of nuts 78 of each clamping assembly 72 threading onto a pair of ends 80 of the U-bolt 74 of each clamping assembly 72 such that the pair of nuts 78 urges the mounting plate 76 toward the portion of the U-bolt 74 of each clamping assembly 72, thereby clamping the floor support member 60 and the cross member between the mounting plate 76 of each clamping assembly 72 and the portion of the U-bolt 74 of each mounting assembly.

In use, the anchoring member 12 is positioned in the anchoring position 26 and secured to the vertical support 24 via the pair of support straps 38. The inserting member is telescopically positioned relative to the receiving member 28 into one of the plurality of locking positions and locked into that position by inserting the pin portion 54 of the locking pin 50 concurrently into the receiving member hole 46 corresponding to the locking position and the inserting member hole. The locking pin 50 is secured to the receiving member 28 and the inserting member 40 by coupling the retaining wire 52 to the second end 58 of the pin portion 54 of the locking pin 50. The floor 68 of the deer stand 70 is then securely clamped to the floor support member 60 using the pair of clamping assemblies 72.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A deer stand support device comprising:
    a deer stand having a floor, said floor having a pair of spaced and parallel cross members extending perpendicularly to a first pair of opposed sections of an outer periphery of said floor, said pair of spaced and parallel cross members extends parallel to a second pair of opposed sections of the outer periphery of said floor;
    an anchoring member, said anchoring member having a top end and a bottom end, said anchoring member being configured for positioning in an anchoring position whereby said anchoring member abuts a vertical support, said top end of said anchoring member facing upward while said anchoring member is in said anchoring position;
    a receiving member, said receiving member extending from said anchoring member, said receiving member being angled away from said bottom end of said anchoring member, said receiving member defining a hollow space, said receiving member being configured for extending away from the vertical support when said anchoring member is in said anchoring position;
    a support strap, said support strap being flexible, said support strap being configured for looping around the vertical support and said anchoring member while said anchoring member is in said anchoring position, said support strap being configured for engaging said anchoring member, thereby clamping said anchoring member to the vertical support;
    an inserting member, said inserting member being telescopically coupled to said receiving member, said inserting member inserting into said hollow space of said receiving member, said inserting member being lockable in each of a plurality of locking positions relative to said receiving member;
    a floor support member, said floor support member being coupled to said inserting member;
    said floor support member having a pair of ends, said inserting member being coupled to said floor support member between said pair of ends of said floor support member, said floor support member extending laterally from said inserting member, said floor support member having a length greater than a distance between said cross members of said floor; and
    a pair of clamps, each clamp being positionable around the floor of the deer stand, a respective one of said cross members of said floor, and said floor support member proximate an associated end of said pair of ends of said floor support member, each said clamp being configured for securing said floor support member to the floor of the deer stand by clamping said floor support member to the cross members and the floor of the deer stand.

2. The device of claim 1, further comprising:
    a plurality of receiving member holes, said plurality of receiving member holes extending through said receiving member;
    an inserting member hole, said inserting member hole being positionable in alignment with each said receiving member hole; and
    a locking pin, said locking pin being insertable concurrently through said inserting member hole and each said receiving member hole when said inserting member hole is aligned with each said receiving member hole, thereby securing said inserting member to said receiving member in each of said plurality of locking positions.

3. The device of claim 2, further comprising said locking pin comprising a retaining wire, said retaining wire being coupled to a first end of a pin portion of said locking pin and removably couplable to a second end of said pin portion of said locking pin opposite said first end of said pin portion of said locking pin, said retaining wire securing said pin portion of said locking pin to said receiving member and said inserting member when coupled to said second end of said pin portion of said locking pin while said pin portion of said locking pin is inserted concurrently through said inserting member hole and each said receiving member hole.

4. The device of claim 1, further comprising said floor support member having a top side and a bottom side opposite said top side, said top side of said floor support member and said bottom side of said floor support member extending between said pair of ends of said floor support member, said top side of said floor support member facing upward when said anchoring member is in said anchoring position, said top side of said floor support member being configured for supporting a floor of a deer stand when said anchoring member is in said anchoring position, said inserting member being coupled to said bottom side of said floor support member.

5. The device of claim 4, further comprising said inserting member being centered between said pair of ends of said floor support member.

6. The device of claim 4, further comprising said pair of clamps being a pair of clamping assemblies, each said clamping assembly comprising a U-bolt, a mounting plate, and a pair of nuts, said pair of clamping assemblies being configured for positioning in a clamping configuration for securing the floor of the deer stand to said floor support member proximate a respective end of said pair of ends of said floor support member, said clamping configuration comprising:
    each said clamping assembly receiving said floor support member and a respective one of said cross members of said floor of said deer stand through a space between a portion of said U-bolt of each said clamping assembly and said mounting plate of each said clamping assembly,
    said mounting plate of each said clamping assembly abutting said bottom side of said floor support member,
    said portion of said U-bolt of each said clamping assembly abutting the cross member opposite said floor support member, and
    said pair of nuts of each said clamping assembly being threaded onto each end of a pair of ends of said U-bolt of each said clamping assembly such that said pair of nuts urges said mounting plate toward said portion of said U-bolt of each said clamping assembly, thereby clamping said floor support member and the cross member between said mounting plate of each said clamping assembly and said portion of said U-bolt of each said mounting assembly.

7. The device of claim 1, further comprising:
    said receiving member being coupled to said anchoring member between said top end and said bottom end; and
    said support strap being one of a pair of support straps, said pair of support straps being flexible, said pair of support straps being configured for looping around the vertical support and said anchoring member while said anchoring member is in said anchoring position, each said support strap being configured for engaging said anchoring member between said receiving member and a respective one of said top end of said anchoring member and said bottom end of said anchoring member while said anchoring member is in said anchoring position, thereby clamping said anchoring member to the vertical support.

8. The device of claim 1, further comprising:

said anchoring member having a pair of lateral sides, said pair of lateral sides of said anchoring member extending between said top end of said anchoring member and said bottom end of said anchoring member, said anchoring member having a front side and a back side opposite said front side, said front side and said back side extending between said top end of said anchoring member and said bottom end of said anchoring member and between said pair of lateral sides of said anchoring member, said front side of said anchoring member facing away from the vertical support while said anchoring member is in said anchoring position;

said receiving member extending from said front side of said anchoring member, said receiving member having a proximal end of said receiving member relative to said anchoring member and a distal end of said receiving member relative to said anchoring member, said proximal end of said receiving member being positioned between said top end of said anchoring member and said bottom end of said anchoring member, said receiving member having a pair of lateral sides extending between said proximal end of said receiving member and said distal end of said receiving member, each said lateral side being coplanar with a respective lateral side of said pair of lateral sides of said anchoring member, said receiving member defining an opening to said hollow space on said distal end of said receiving member;

a plurality of receiving member holes, said plurality of receiving member holes extending through said pair of lateral sides of said receiving member;

an inserting member hole, said inserting member hole being positionable in alignment with each said receiving member hole; and a locking pin, said locking pin being insertable concurrently through said inserting member and each said receiving member hole when said inserting member hole is aligned with each said receiving member hole, thereby securing said inserting member to said receiving member in each of said plurality of locking positions.

9. The device of claim 8, further comprising said receiving member being centered between said top end of said anchoring member and said bottom end of said anchoring member, said plurality of receiving member holes being positioned along a central longitudinal axis of said receiving member.

10. The device of claim 1, further comprising said anchoring member being formed of an anchoring member tube, said receiving member being formed of a receiving member tube, said inserting member being formed of an inserting member tube, said floor support member being formed of a floor support member tube.

11. The device of claim 10, further comprising said anchoring member tube being square, said receiving member tube being square, said inserting member tube being square, said floor support member tube being square.

12. A deer stand support device comprising:

a deer stand having a floor, said floor having a pair of spaced and parallel cross members extending perpendicularly to a first pair of opposed sections of an outer periphery of said floor, said pair of spaced and parallel cross members extends parallel to a second pair of opposed sections of the outer periphery of said floor an anchoring member, said anchoring member being elongate between a top end of said anchoring member and a bottom end of said anchoring member, said anchoring member having a pair of lateral sides, said pair of lateral sides of said anchoring member extending between said top end of said anchoring member and said bottom end of said anchoring member, said anchoring member having a front side and a back side opposite said front side, said front side and said back side extending between said top end of said anchoring member and said bottom end of said anchoring member and between said pair of lateral sides of said anchoring member, said anchoring member being formed of an anchoring member tube, said anchoring member tube being square, said anchoring member being configured for positioning in an anchoring position whereby said anchoring member abuts a vertical support, said top end of said anchoring member facing upward and said front side of said anchoring member facing away from the vertical support while said anchoring member is in said anchoring position;

a receiving member, said receiving member extending from said front side of said anchoring member, said receiving member being angled away from said bottom end of said anchoring member, said receiving member being elongate between a proximal end of said receiving member relative to said anchoring member and a distal end of said receiving member relative to said anchoring member, said proximal end of said receiving member being centered between said top end of said anchoring member and said bottom end of said anchoring member, said receiving member having a pair of lateral sides extending between said proximal end of said receiving member and said distal end of said receiving member, each said lateral side being coplanar with a respective lateral side of said pair of lateral sides of said anchoring member, said receiving member defining a hollow space and defining an opening on said distal end of said receiving member, said receiving member being formed of a receiving member tube, said receiving member tube being square;

a pair of support straps, said pair of support straps being flexible, said pair of support straps being configured for looping around the vertical support and said anchoring member while said anchoring member is in said anchoring position, each said support strap being configured for engaging said front side of said anchoring member between said receiving member and a respective one of said top end of said anchoring member and said bottom end of said anchoring member while said anchoring member is in said anchoring position, thereby clamping said anchoring member to the vertical support;

an inserting member, said inserting member being telescopically coupled to said receiving member, said inserting member inserting through said opening and into said hollow space of said receiving member, said inserting member being elongate between a proximal end of said inserting member relative to said receiving member and a distal end of said inserting member relative to said receiving member, said inserting member being lockable in each of a plurality of locking positions relative to said receiving member, said inserting member being formed of an inserting member tube, said inserting member tube being square;

a plurality of receiving member holes, said plurality of receiving member holes extending through said pair of lateral sides of said receiving member, said plurality of receiving member holes being positioned along a central longitudinal axis of said receiving member;

an inserting member hole, said inserting member hole being positionable in alignment with each said receiving member hole;

a locking pin, said locking pin being insertable concurrently through said inserting member hole and each said receiving member hole when said inserting member hole is aligned with each said receiving member hole, thereby securing said inserting member to said receiving member in each of said plurality of locking positions, said locking pin comprising a retaining wire, said retaining wire being coupled to a first end of a pin portion of said locking pin and removably couplable to a second end of said pin portion of said locking pin opposite said first end of said pin portion of said locking pin, said retaining wire securing said pin portion of said locking pin to said receiving member and said inserting member when coupled to said second end of said pin portion of said locking pin while said pin portion of said locking pin is inserted concurrently through said inserting member hole and each said receiving member hole;

a floor support member, said floor support member being coupled to said distal end of said inserting member, said floor support member being elongate between a pair of ends of said floor support member, said floor support member having a top side and a bottom side opposite said top side, said top side of said floor support member and said bottom side of said floor support member extending between said pair of ends of said floor support member, said inserting member being coupled to said bottom side of said floor support member and centered between said pair of ends of said floor support member, said floor support member extending laterally from said inserting member, said top side of said floor support member facing upward when said anchoring member is in said anchoring position, said top side of said floor support member being configured for supporting the floor of the deer stand when said anchoring member is in said anchoring position, said floor support member being formed of a floor support member tube, said floor support member tube being square; and a pair of clamping assemblies, each said clamping assembly comprising a U-bolt, a mounting plate, and a pair of nuts, said pair of clamping assemblies being configured for positioning in a clamping configuration for securing the floor of the deer stand to said floor support member proximate a respective end of said pair of ends of said floor support member, said clamping configuration comprising:

each said clamping assembly receiving said floor support member and a respective one of said cross members of said floor of said deer stand through a space between a portion of said U-bolt of each said clamping assembly and said mounting plate of each said clamping assembly, said mounting plate of each said clamping assembly abutting said bottom side of said floor support member, said portion of said U-bolt of each said clamping assembly abutting the cross member opposite said floor support member, and said pair of nuts of each said clamping assembly being threaded onto each end of a pair of ends of said U-bolt of each said clamping assembly such that said pair of nuts urges said mounting plate toward said portion of said U-bolt of each said clamping assembly, thereby clamping said floor support member and the cross member between said mounting plate of each said clamping assembly and said portion of said U-bolt of each said mounting assembly.

\* \* \* \* \*